US012570222B2

(12) United States Patent
Kwiatek et al.

(10) Patent No.:  US 12,570,222 B2
(45) Date of Patent:       Mar. 10, 2026

(54) COVER ASSEMBLIES FOR SEAT RAIL AT VEHICLE FLOOR

(71) Applicant: Atieva, Inc., Newark, CA (US)

(72) Inventors: Marek Kwiatek, Tychy (PL); Khaled Abdo, Foster City, CA (US); Karan Shrikant Gujarathi, Hayward, CA (US)

(73) Assignee: Atieva, Inc., Newark, CA (US)

( * ) Notice: Subject to any disclaimer, the term of this patent is extended or adjusted under 35 U.S.C. 154(b) by 29 days.

(21) Appl. No.: 18/510,208

(22) Filed: Nov. 15, 2023

(65) Prior Publication Data

US 2025/0153657 A1      May 15, 2025

(51) Int. Cl.
B60N 2/07        (2006.01)
B60R 13/04       (2006.01)

(52) U.S. Cl.
CPC ............ B60R 13/04 (2013.01); B60N 2/0722 (2013.01)

(58) Field of Classification Search
CPC .... B60R 13/04; B60N 2/0722; B60N 2/0725; B60N 2/0727; B60N 2/07; B60N 2/0715
See application file for complete search history.

(56) References Cited

U.S. PATENT DOCUMENTS

| | | | | | |
|---|---|---|---|---|---|
| 5,188,329 | A | * | 2/1993 | Takahara | B60N 2/0725 |
| | | | | | 297/344.1 |
| 5,199,926 | A | * | 4/1993 | Hennig | B23Q 11/0875 |
| | | | | | 464/170 |

| | | | | | |
|---|---|---|---|---|---|
| 5,482,243 | A | * | 1/1996 | Minder | B60N 2/0725 |
| | | | | | 248/429 |
| 7,097,401 | B2 | * | 8/2006 | Haspel | B60P 7/0815 |
| | | | | | 410/101 |
| 7,191,981 | B2 | * | 3/2007 | Laib | B64D 11/0696 |
| | | | | | 244/118.6 |
| 9,592,903 | B2 | * | 3/2017 | Wottke | B64C 1/18 |
| 10,807,503 | B2 | * | 10/2020 | Tuffs | B60N 2/0715 |
| 11,214,176 | B2 | * | 1/2022 | Gross | B64D 11/0696 |
| 11,325,505 | B2 | * | 5/2022 | Kato | B60N 2/0705 |
| 2005/0242604 | A1 | * | 11/2005 | Bonnes | B60R 7/04 |
| | | | | | 296/35.1 |

(Continued)

FOREIGN PATENT DOCUMENTS

DE        102021214871 A1      1/2023

OTHER PUBLICATIONS

International Search Report and Written Opinion for PCT Application No. PCT/US2024/055922, mailed on Feb. 13, 2025, 14 pages.

*Primary Examiner* — Nkeisha Smith
(74) *Attorney, Agent, or Firm* — Brake Hughes Bellermann LLP

(57) ABSTRACT

A cover assembly for a seat rail mounted to a floor of a vehicle comprises: a structural housing configured to be mounted to the floor of the vehicle, the structural housing defining tracks, the tracks positioned on opposite sides of an opening for a moving seat rail to ride on the seat rail; telescoping covers comprising a fixed cover attached to the structural housing, a first moving cover configured to slide on the tracks relative to the fixed cover, and a second moving cover configured to be mounted to the moving seat rail and slide on the tracks relative to the first moving cover and the fixed cover; and a biasing member coupled to the first moving cover and to the structural housing.

20 Claims, 18 Drawing Sheets

(56)                    References Cited

U.S. PATENT DOCUMENTS

| | | | |
|---|---|---|---|
| 2005/0247820 A1* | 11/2005 | Feist ..................... | H02G 11/02 |
| | | | 244/118.6 |
| 2006/0097109 A1* | 5/2006 | Laib .................. | B64D 11/0696 |
| | | | 244/118.6 |
| 2007/0170743 A1* | 7/2007 | Kinoshita ............ | B60N 2/0818 |
| | | | 296/65.13 |
| 2015/0145298 A1* | 5/2015 | Wottke ............... | B64D 11/0696 |
| | | | 297/243 |
| 2016/0101868 A1* | 4/2016 | Daouk ................ | B60N 2/0725 |
| | | | 297/463.1 |
| 2020/0307417 A1* | 10/2020 | Ornan ................. | B60N 2/0264 |
| 2023/0339578 A1* | 10/2023 | Jennings ............. | B60N 2/0705 |

* cited by examiner

300

302

304

2000

1104

2000    1106

2000

2200

COVER ASSEMBLIES FOR SEAT RAIL AT VEHICLE FLOOR

TECHNICAL FIELD

This document relates to cover assemblies for a seat rail at a vehicle floor.

BACKGROUND

Many vehicles have one or more seats that can be moved along a rail on the vehicle floor. Some attempts have been made for covering parts of the rail while allowing the full range of seat movement. One previous approach uses a sliding plate attached to the seat, wherein the plate slides under the surrounding carpet upon the seat moving forward. This approach requires packaging space being available in the floor throughout some distance ahead of the rail. When implemented in a second-row seat, this previous approach may be practical to use only when the second-row seat rests on a single pillar underneath the seat, because packaging space for the plate may be available between a pair of rails used by the front seat. Another previous approach use a rubber seal on both sides of the rail. This previous approach may be unsightly and may leave a gap open where the rail is not covered.

SUMMARY

In a first aspect, a cover assembly for a seat rail mounted to a floor of a vehicle comprises: a structural housing configured to be mounted to the floor of the vehicle, the structural housing defining tracks, the tracks positioned on opposite sides of an opening for a moving seat rail to ride on the seat rail; telescoping covers comprising a fixed cover attached to the structural housing, a first moving cover configured to slide on the tracks relative to the fixed cover, and a second moving cover configured to be mounted to the moving seat rail and slide on the tracks relative to the first moving cover and the fixed cover; and a biasing member coupled to the first moving cover and to the structural housing.

Implementations can include any or all of the following features. The cover assembly is configured for installation in front of a seat that has the moving seat rail. The opening is toward a rear of the structural housing when the cover assembly is installed in the vehicle. The cover assembly has at least a first use position corresponding to the moving seat rail being in a position fully rearward in the opening, and wherein in the first use position the first and second moving covers are positioned to cover the opening. The cover assembly has at least a second use position corresponding to the moving seat rail being in a position fully forward in the opening, and wherein in the second use position the fixed cover, the first moving cover, and the second moving cover are all substantially overlapping in front of the opening. The cover assembly further comprises a detent that limits movement of the first moving cover relative to the fixed cover. The detent comprises a first lip on the fixed cover that extends toward the first moving cover, and a second lip on the first moving cover that extends toward the fixed cover. The cover assembly further comprises a detent that limits movement of the first and second moving covers relative to each other. The detent comprises a first lip on the first moving cover that extends toward the second moving cover, and a second lip on the second moving cover that extends toward the first moving cover. The biasing member comprises an elastic band. The tracks comprise: first side tracks that are parallel with each other and extend along opposite sides of the opening from a beginning of the opening and to a point past an end of the opening, wherein the first moving cover defines first sliders, at least one of the first sliders positioned on each of opposite sides of the first moving cover, the first sliders positioned in the first side tracks; and second side tracks that are parallel with each other and extend along the opposite sides of the opening from the beginning of the opening and to the point past an end of the opening, the second side tracks being parallel with, and positioned below, the first side tracks, wherein the second moving cover defines second sliders, at least one of the second sliders positioned on each of opposite sides of the second moving cover, the second sliders positioned in the second side tracks. The cover assembly further comprises friction-reducing sliders, the friction-reducing sliders mounted between each of the first sliders and the first side tracks, and between each of the second sliders and the second side tracks. The first moving cover has a first C-shaped profile when viewed along the seat rail. The second moving cover has a second C-shaped profile when viewed along the seat rail. The fixed cover has a third C-shaped profile when viewed along the seat rail. The first, second and third C-shaped profiles are configured so that i) the third C-shaped profile fits at least partially inside the first C-shaped profile, and ii) the first C-shaped profile fits at least partially inside the second C-shaped profile. The tracks are formed by recesses in the structural housing.

In a second aspect, a cover assembly for a seat rail mounted to a floor of a vehicle comprises: a structural housing configured to be mounted to the floor of the vehicle, the structural housing defining: an opening for a moving seat rail to ride on the seat rail; first side tracks that are parallel with each other and extend along opposite sides of the opening from a beginning of the opening and to a point past an end of the opening; and second side tracks that are parallel with each other and extend along the opposite sides of the opening from the beginning of the opening and to the point past an end of the opening, the second side tracks being parallel with, and positioned below, the first side tracks; a fixed cover that is fixed to the structural housing; a first moving cover having first sliders, at least one of the first sliders positioned on each of opposing sides of the first moving cover, the first sliders positioned in the first side tracks; and a second moving cover having second sliders, at least one of the second sliders positioned on each of opposing sides of the second moving cover, the second sliders positioned in the second side tracks, the second moving cover to be mounted to the moving seat rail.

Implementations can include any or all of the following features. The cover assembly further comprises a detent that limits movement of the first moving cover relative to the fixed cover. The detent comprises a first lip on the fixed cover that extends toward the first moving cover, and a second lip on the first moving cover that extends toward the fixed cover. The cover assembly further comprises a detent that limits movement of the first and second moving covers relative to each other. The detent comprises a first lip on the first moving cover that extends toward the second moving cover, and a second lip on the second moving cover that extends toward the first moving cover. The cover assembly further comprises friction-reducing sliders, the friction-reducing sliders mounted between each of the first sliders and the first side tracks, and between each of the second sliders and the second side tracks. The cover assembly further comprises an elastic band coupled to the first moving cover and to the structural housing.

In a third aspect, a vehicle comprises: a vehicle body including a passenger compartment; a seat having a first moving seat rail to ride on a first seat rail mounted to a floor of the passenger compartment; and a first cover assembly for the first seat rail, the first cover assembly comprising: a first structural housing configured to be mounted to the floor of the vehicle, the first structural housing defining tracks, the tracks positioned on opposite sides of an opening for the moving seat rail to ride on the seat rail; first telescoping covers comprising a fixed cover attached to the structural housing, a first moving cover configured to slide on the tracks relative to the fixed cover, and a second moving cover configured to slide on the tracks relative to the first moving cover and the fixed cover; and a first biasing member coupled to the first moving cover and to the structural housing.

Implementations can include any or all of the following features. The seat further has a second moving seat rail to ride on a second seat rail mounted to the floor of the passenger compartment, the vehicle further comprising a second cover assembly including a second structural housing, second telescoping covers, and a second biasing member. The seat is a second-row seat. The cover assembly is installed in front of the seat. The first moving cover has a first C-shaped profile when viewed along the first seat rail. The second moving cover has a second C-shaped profile when viewed along the first seat rail. The fixed cover has a third C-shaped profile when viewed along the first seat rail. The first, second and third C-shaped profiles are configured so that i) the third C-shaped profile fits at least partially inside the first C-shaped profile, and ii) the first C-shaped profile fits at least partially inside the second C-shaped profile.

BRIEF DESCRIPTION OF DRAWINGS

Like reference symbols in the various drawings indicate like elements.

DETAILED DESCRIPTION

Figure 1:
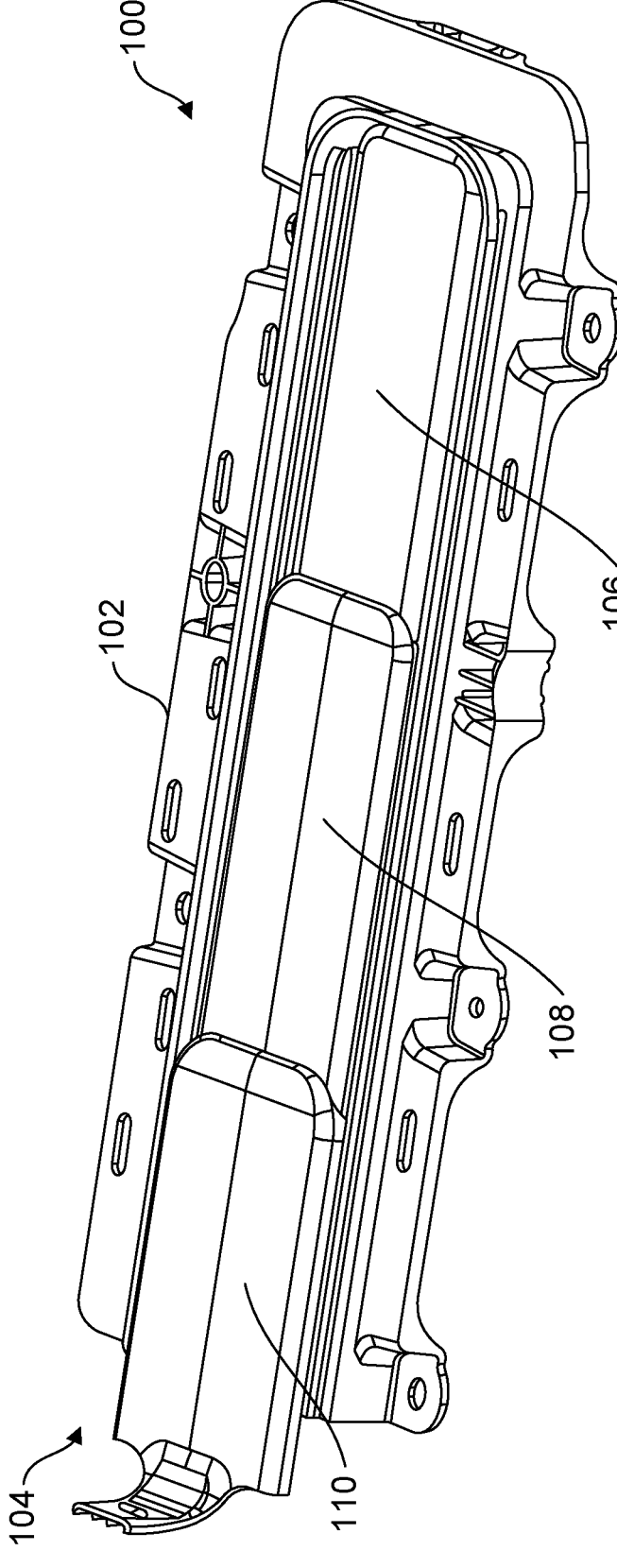
FIG. 1 shows an example of a cover assembly.

This document describes examples of systems and techniques to provide a cover assembly for a seat rail at a vehicle floor. A cover assembly can be configured so that it completely covers the seat rail at all times. For example, the seat can be placed at any of multiple locations along the seat rail, and the cover assembly covers the seat rail with each of placements. A cover assembly can provide a robust surface for an occupant to step on in each of the placements of the seat. A cover assembly can be used with seat rails that feature a significant amount of forward-backward travel, including several decimeters of distance. A cover assembly can be used with seat rails that are mounted vertically below the floor carpet level (e.g., at a lower-z-plane than the floor carpet level with reference to a vehicle coordinate system). A cover assembly can have its topmost surface (e.g., a surface an occupant may step on) that is substantially at the same height as the floor carpet level. A cover assembly can telescopically adapt when the seat moves to facilitate uninterrupted seat movement while providing a physical safety barrier against the mechanism of the moving seat.

In some implementations, a cover assembly can include a fixed plate, a rear moving plate, a front moving plate, a stationary structural housing, and a biasing member. The structural housing can be mounted to the vehicle body, such as to a metal underbody (e.g., the body-in-white). The front and rear moving plates slide in designated recesses of the structural housing acting as sliding tracks. The moving plates can have friction-reducing sliders to slide in C-shaped housing tracks. The biasing member can be an elastic band can keep the front and rear moving plates pulled toward each other to avoid any undesired sliding between them. The shapes of the moving plates can have "hard stops" or other detents to limit unwanted motion of the plates. For example, a hard stop on the rear moving plate can pull the front moving plate with it during seat rearward movement, and can also prevent the front moving plate from being pulled forward by an occupant. For example, a hard stop on the fixed plate can limit the rearward travel of the front moving plate. The cover assembly can handle a significant static load while stationary, and a considerable static load while traveling, as least for a limited number of travel cycles.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle.

Examples described herein refer to a structural housing. As used herein, a structural housing is structure configured to hold moving covers and at least one fixed cover to at least partially cover a seat rail at a vehicle floor. The structural housing can provide tracks for moving covers. The structural housing can accommodate telescoping covers.

Examples described herein refer to a seat rail mounted to a floor of a vehicle. As used herein, a seat rail mounted to a floor of a vehicle is firmly fixed to the vehicle body and does not slide or otherwise move relative to the floor during normal use.

Examples described herein refer to a moving seat rail. As used herein, a moving seat rail is firmly fixed to a seat of the vehicle. When the seat during normal use is moved along a seat rail mounted to the floor, the moving seat rail moves with the seat.

Examples described herein refer to a moving cover. As used herein, a moving cover is a cover that is moveable between at least two positions. A moving cover can be configured to be moved using one or more tracks.

Examples described herein refer to telescoping covers. As used herein, telescoping covers include moving covers and at least one fixed cover that feature telescopic movement. For example, each of the moving covers can be moved relative to at least the fixed cover along a common direction.

Examples described herein refer to friction-reducing sliders. As used herein, friction-reducing sliders include any component applied between two elements that lowers the coefficient of friction between the elements. For example, a friction-reducing slider applied between a slider of a cover and a track of a structural housing lowers the coefficient of friction that would otherwise exist between the slider and the track.

Examples described herein refer to a front, rear, top, or a bottom. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 shows an example of a cover assembly 100. The cover assembly 100 can be used with one or more other examples described elsewhere herein. The cover assembly 100 includes a structural housing 102. The structural housing 102 can be made from any material, including but not limited to a plastic material. The structural housing 102 is configured to be mounted to the floor of a vehicle. The structural housing 102 defines tracks positioned on opposite sides of an opening, for example as described below. The cover assembly 100 includes telescoping covers 104. The telescoping covers 104 can be made from any material, including but not limited to a plastic material. The telescoping covers 104 can include a fixed cover 106. The fixed cover 106 can be attached to the structural housing 102. The telescoping covers 104 can include a moving cover 108. The moving cover 108 can be configured to slide on the tracks of the structural housing 102 relative to the fixed cover 106. The telescoping covers 104 can include a moving cover 110. The moving cover 110 can be configured to be mounted to a moving seat rail of a seat and slide on the tracks relative to the moving cover 108 and the fixed cover 106.

The cover assembly 100 can have multiple use positions. Here, the cover assembly 100 is shown in a first use position that can correspond to the seat being fully rearward in the vehicle. For example, in the first use position the moving covers 108-110 are positioned to cover the opening of the structural housing 102.

Figure 2:
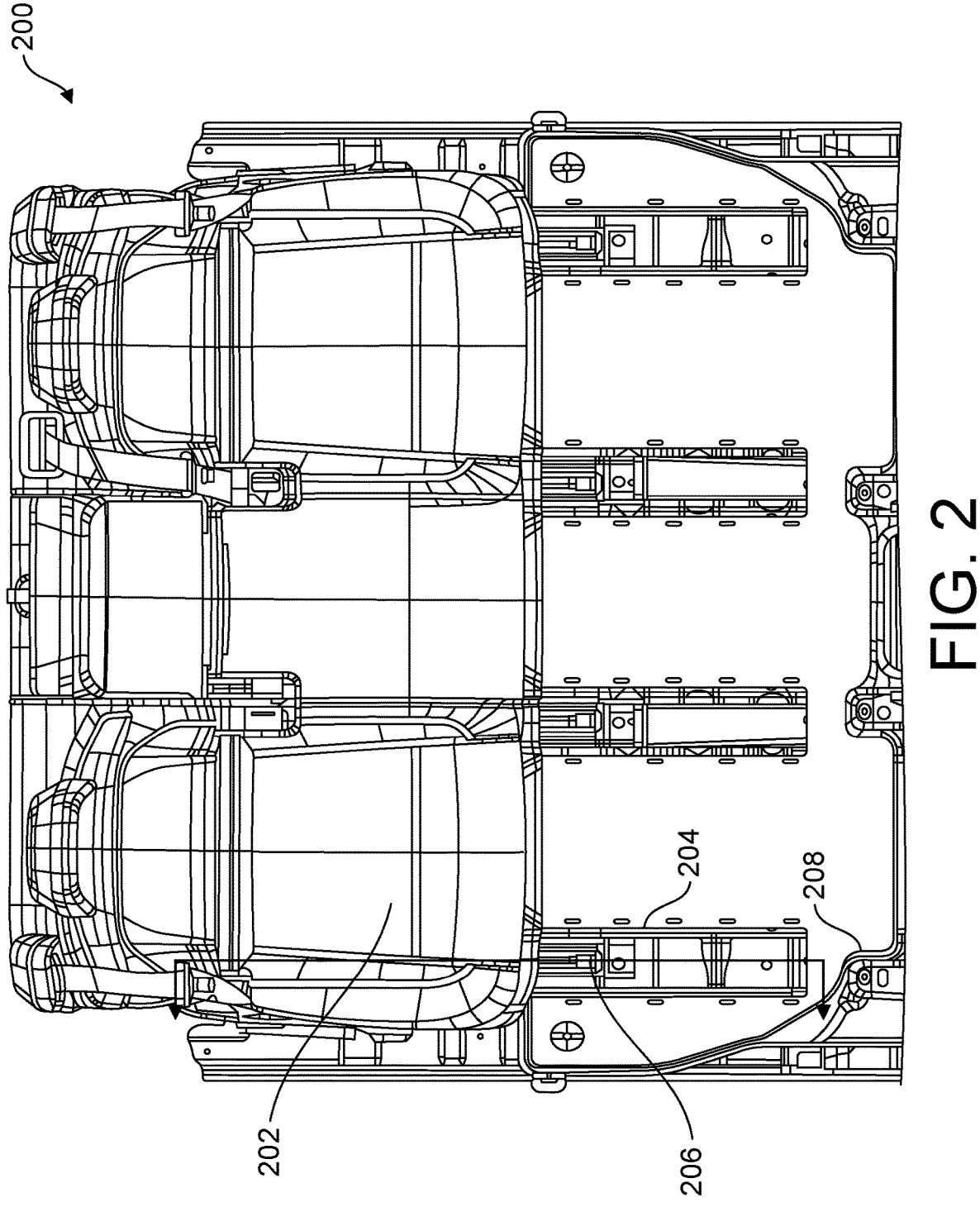
FIG. 2 shows an example of a passenger compartment having a seat with which the cover assembly of FIG. 1 can be used.

FIG. 2 shows an example of a passenger compartment 200 having a seat 202 with which the cover assembly 100 of FIG. 1 can be used. The passenger compartment 200 is here partially shown, and aspects such as front-row seats as well as the cover assembly 100 are omitted for illustrative purposes. The passenger compartment 200 can include multiple seats, and the following description can apply to one or more of them.

The seat 202 can be positioned in a subsequent row behind the front row, such as in a second row or in a third row. The seat 202 is here shown in its most rearward position relative to a seat rail 204 mounted to the floor of the vehicle body. The seat 202 can have a moving seat rail 206 that is configured for traveling along the seat rail 204. The seat rail 204 is here visible in front of the seat 202. Accordingly, the cover assembly 100 can be configured for installation in front of the seat 202 in the passenger compartment 200. The seat 202 can have more than one of the seat rail 204 and the moving seat rail 206, each of which can then have a corresponding instance of the cover assembly 100.

Structure 208 is part of the floor rails for a first-row seat. Because the seat rail 204 is substantially aligned with the structure 208, the packaging space is limited in the floor in front of the seat rail 204. The cover assembly 100 can therefore provide an advantageous approach for covering the seat rail 204. For example, the cover assembly 100 covers the seat rail 204 during the entire range of travel by the seat 202 while requiring essentially no packaging space in front of the seat rail 204.

Figure 3:
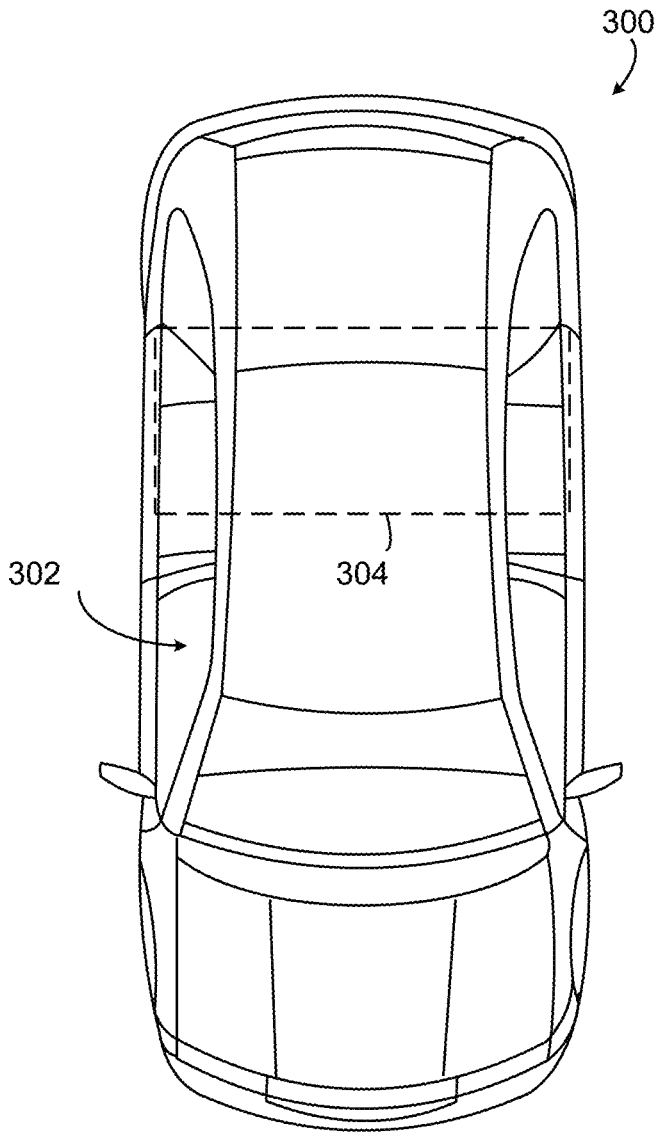
FIG. 3 shows an example of a vehicle in which the seat of FIG. 2 and/or the cover assembly of FIG. 1 can be used.

FIG. 3 shows an example of a vehicle 300 in which the seat 202 of FIG. 2 and/or the cover assembly 100 of FIG. 1 can be used. The vehicle 300 can be used with one or more other examples described elsewhere herein. The vehicle 300 is shown from above and has a vehicle body with a passenger compartment 302 that is here partially visible through the windows. The vehicle 300 can be of a type that has two or more rows of seats for occupants. The vehicle 300 can be a sport utility vehicle, a crossover vehicle, a minivan, a station wagon, or another type of vehicle. The vehicle 300 can have a seat structure 304 positioned in a subsequent row of the passenger compartment 302. In some implementations, the seat structure 304 includes at least one instance of the seat 202 provided with the cover assembly 100.

Figure 4:
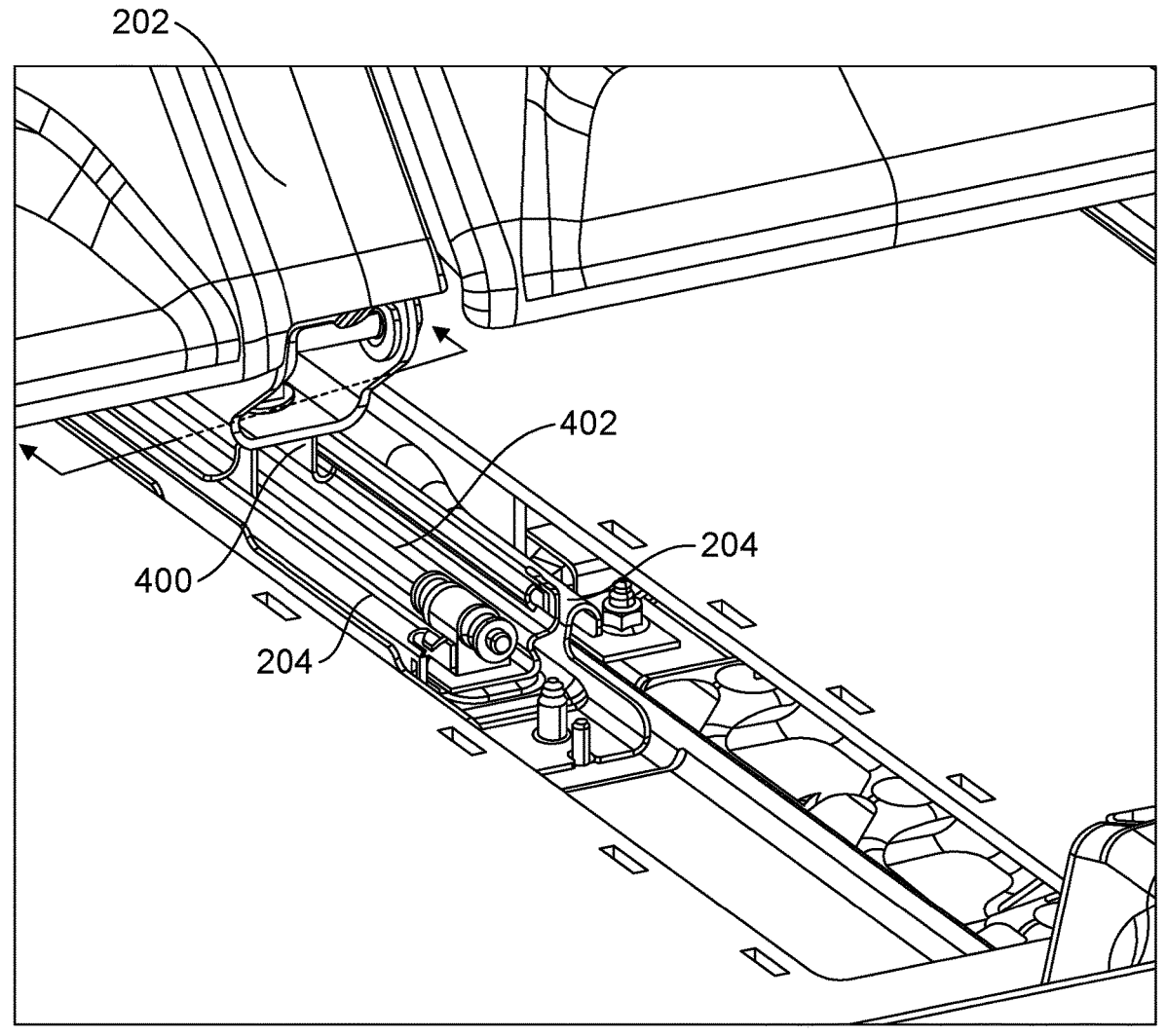
FIG. 4 shows an example of a seat rail of the seat of FIG. 2.

FIG. 4 shows an example of the seat rail 204 of the seat 202 of FIG. 2. The seat 202 has a moving seat rail 400 configured for travel along the seat rail 204. Particularly, a lead screw 402 can be rotated in either direction to effectuate forward and rearward travel of the seat 202. The seat rail 204 is here shown without the cover assembly 100 for illustrative purposes.

Figure 5:
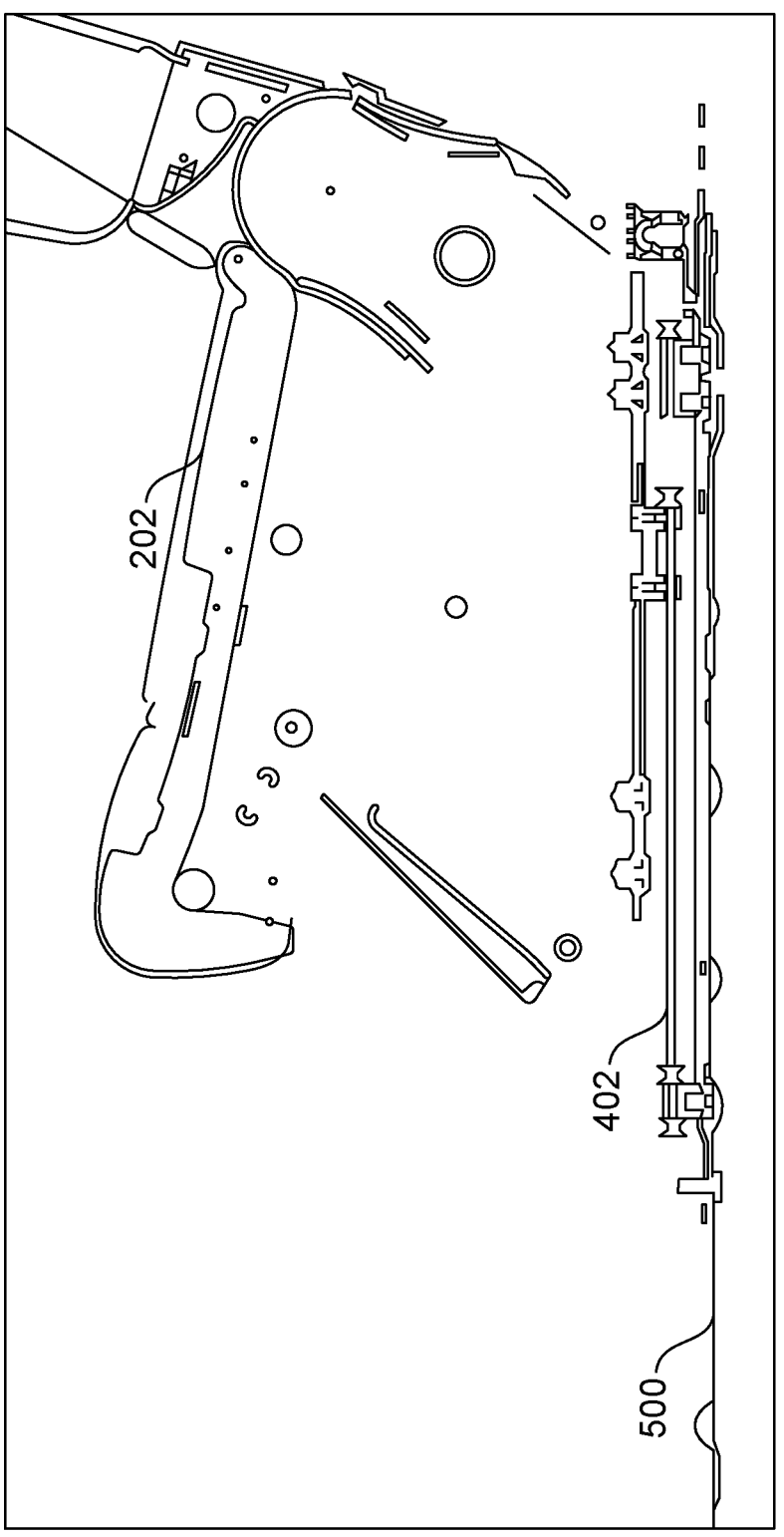
FIG. 5 shows an example of a cross section of the seat of FIG. 2 in a fully rearward position.

FIG. 5 shows an example of a cross section of the seat 202 of FIG. 2 in a fully rearward position. The position of the seat 202 and the lead screw 402 relative to a vehicle floor 500 is illustrated.

Figure 6:
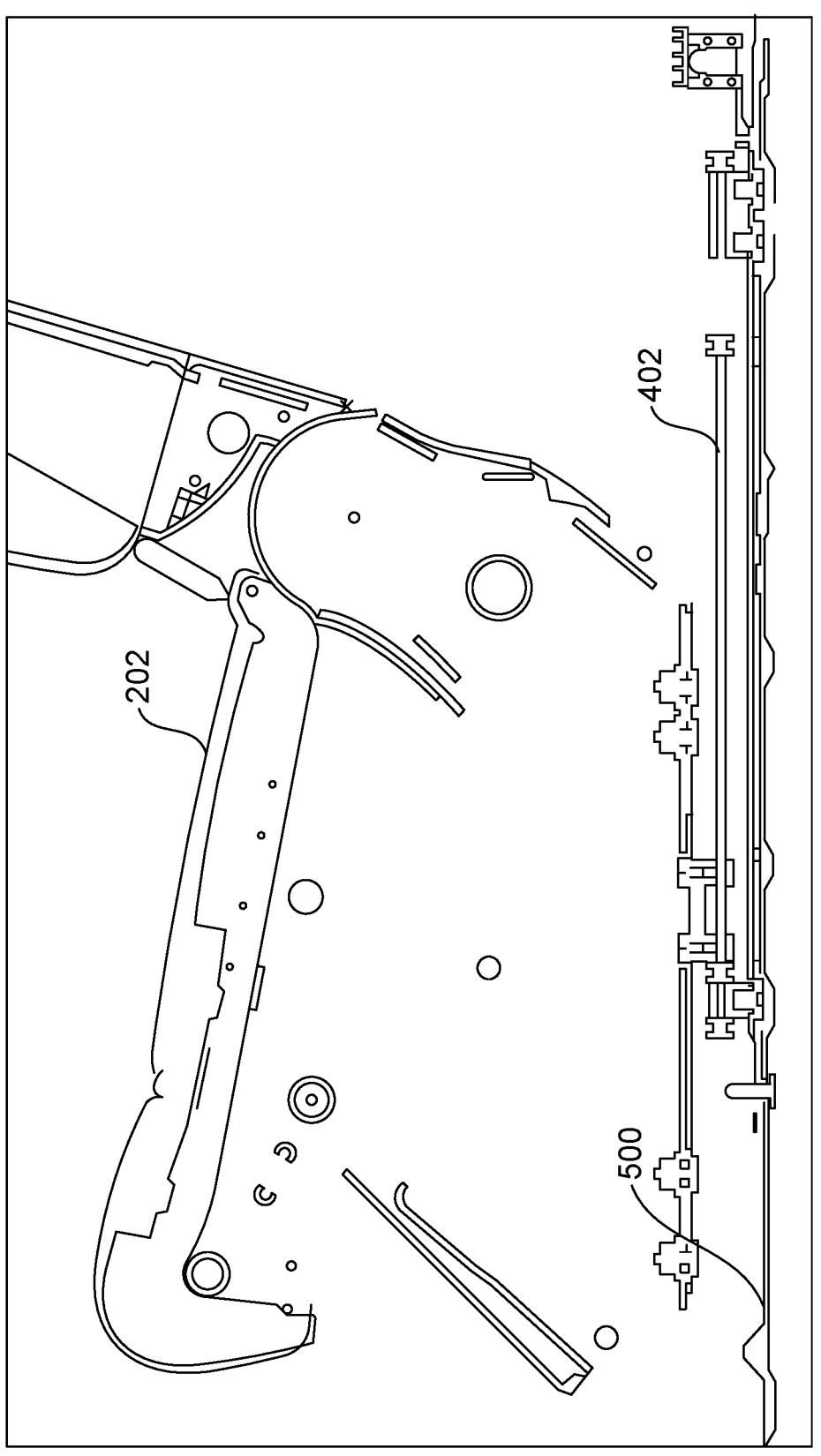
FIG. 6 shows an example of a cross section of the seat of FIG. 2 in a fully forward position.

FIG. 6 shows an example of a cross section of the seat 202 of FIG. 2 in a fully forward position. The position of the seat 202 and the lead screw 402 relative to the vehicle floor 500 is illustrated.

Figure 7:
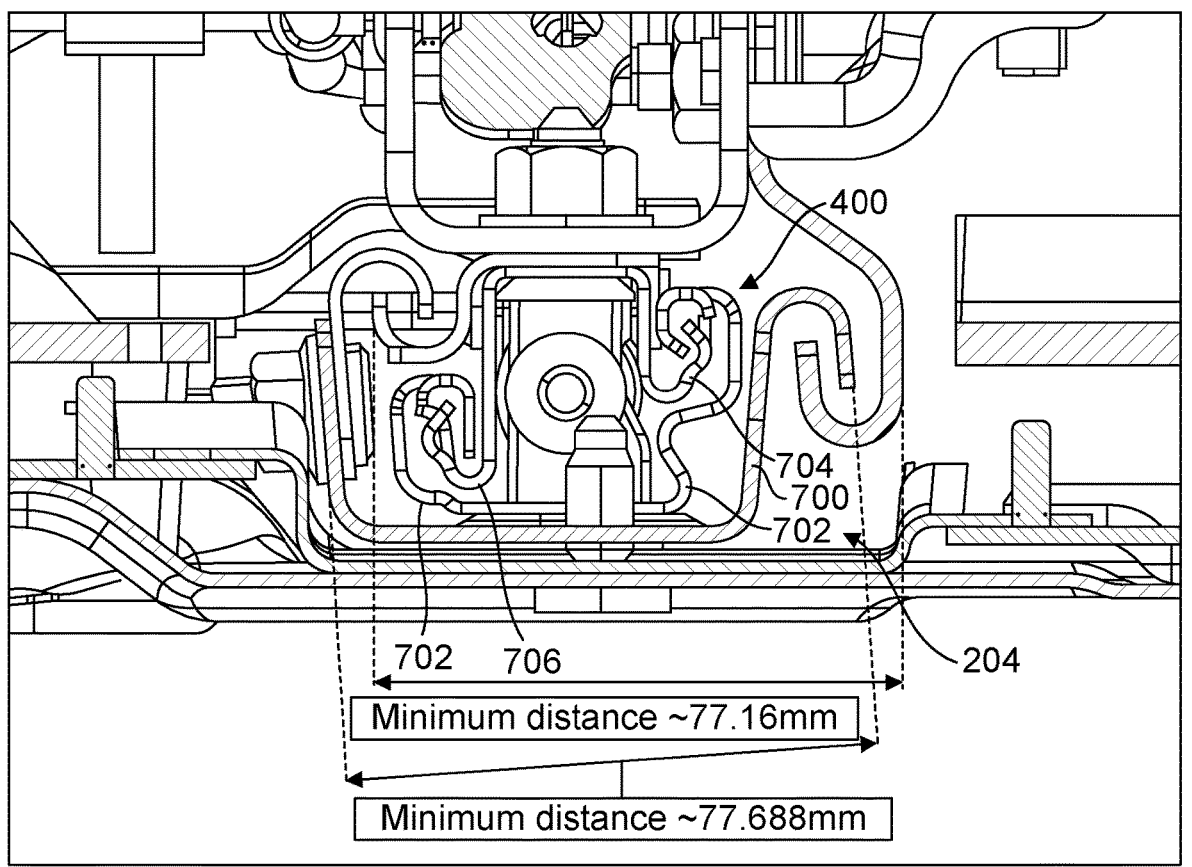
FIG. 7 shows an example of a cross section of the seat rail of FIG. 4.

FIG. 7 shows an example of a cross section of the seat rail 204 of FIG. 4. The seat rail 204 includes a rail 700 and a rail 702. The moving seat rail 400 includes a rail 704 and a rail 706. Other approaches can be used.

Figure 8:
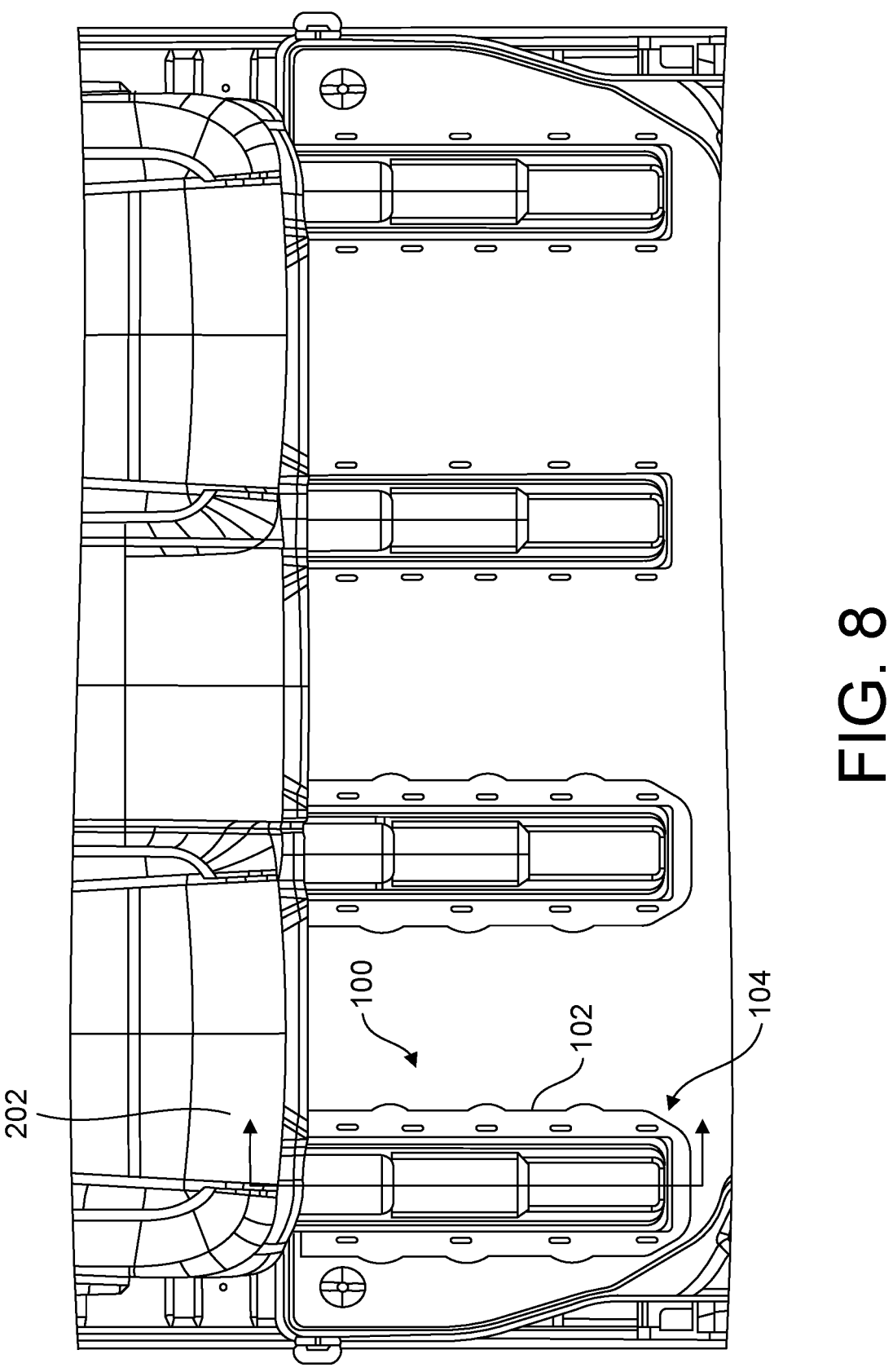
FIG. 8 shows an example of the seat of FIG. 2 with the cover assembly of FIG. 1.

FIG. 8 shows an example of the seat 202 of FIG. 2 with the cover assembly 100 of FIG. 1. The cover assembly 100 including the structural housing 102 and the telescoping covers 104 currently covers the seat rail of the seat 202. The seat 202 which is shown in its most rearward position can have one instance of the cover assembly 100 for each seat rail.

With reference again briefly to FIG. 1, that illustration shows a perspective view of the cover assembly 100 with the seat 202 in its most rearward position. When the seat 202 begins traveling forward from the most rearward position, the seat 202 advances the moving cover 110 forward, which is mounted to the moving seat rail of the seat 202. The cover assembly 100 may eventually assume a position where the moving cover 110 substantially overlaps the moving cover 108, for example as will now be described.

Figure 9:
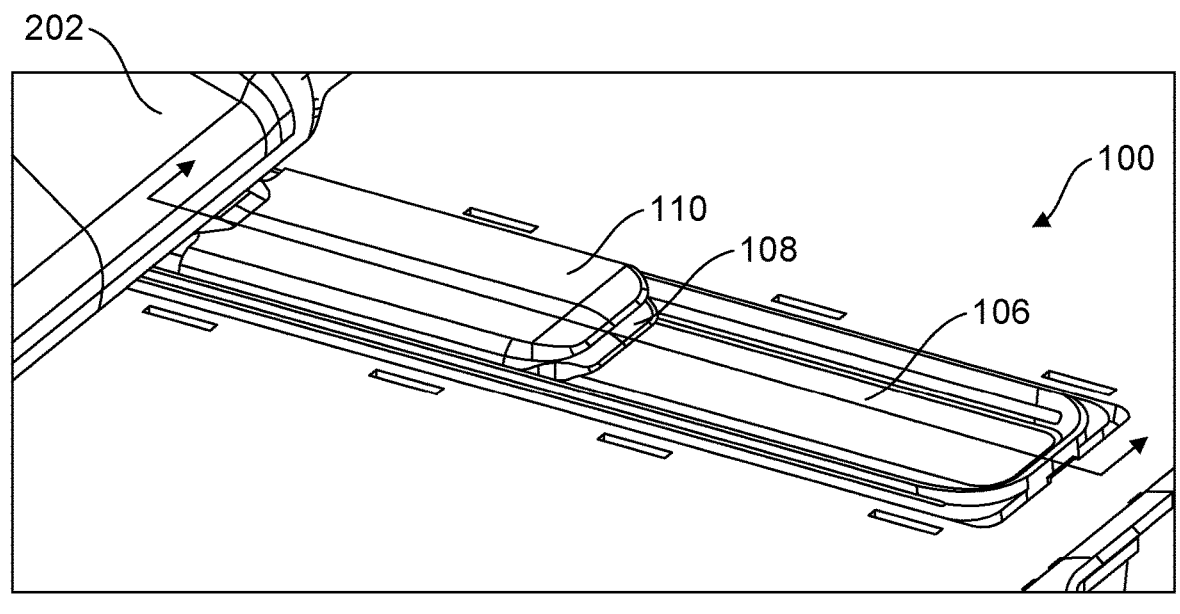
FIG. 9 shows an example of a perspective view of the seat and the cover assembly of FIG. 8 in the intermediate position.

FIG. 9 shows an example of a perspective view of the seat 202 and the cover assembly 100 of FIG. 8 in the intermediate position. The moving cover 110 substantially overlaps the moving cover 108. The moving cover 108 has not been moved forward compared to the example shown in FIG. 1. As such, the fixed cover 106 is here visible in the intermediate position. In some implementations, any position of the seat 202 between the most rearward position (e.g., as shown in FIG. 1) and an intermediate position (e.g., as shown in FIG. 9) can be characterized as a comfort setting for an occupant of the seat 202. For example, the occupant of the seat 202 adjusts the position of the seat 202 forward or backward within that range based on the occupant's preference.

Figure 10:
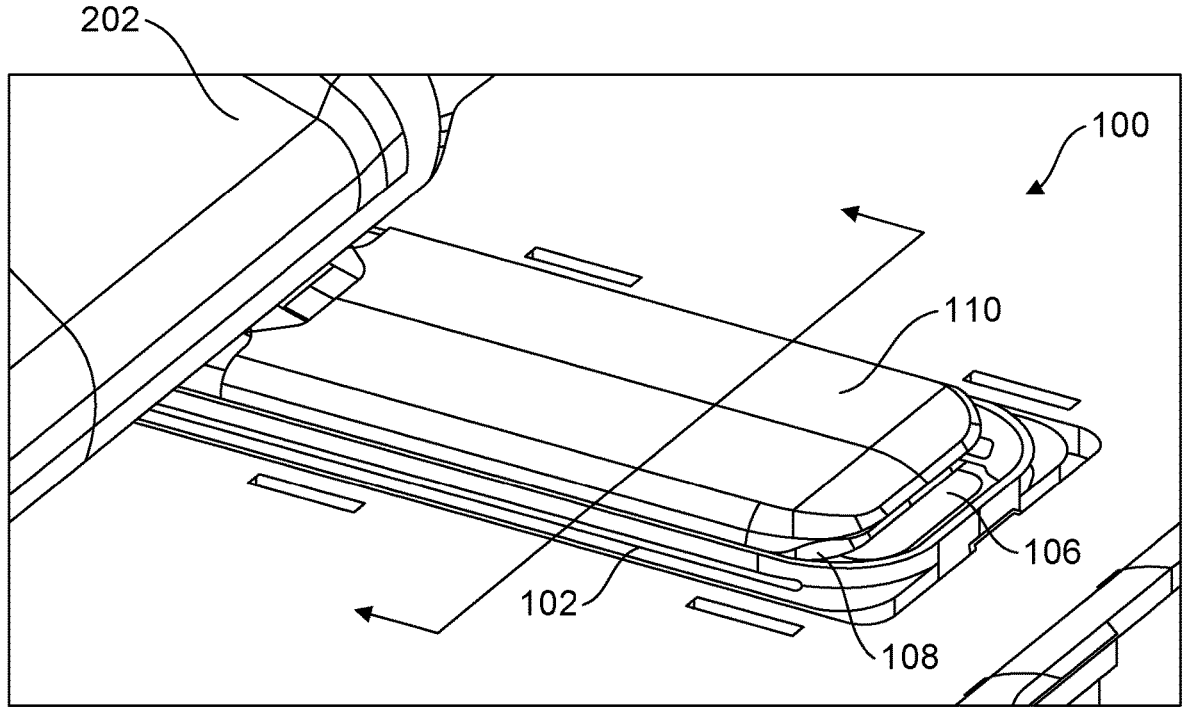
FIG. 10 shows an example of a perspective view of the seat and the cover assembly of FIG. 8 in the fully forward position.

FIG. 10 shows an example of a perspective view of the seat 202 and the cover assembly 100 of FIG. 8 in the fully forward position. The moving cover 110 and the moving cover 108 here substantially overlap the fixed cover 106 in front of the opening of the structural housing 102, which can be a second use position of the cover assembly 100. In some implementations, any fully forward position of the seat 202 (e.g., as shown in FIG. 10) can be characterized as an ingress/egress position for a seat in a row behind the seat 202. For example, the seat 202 can be in a second row and the fully forward position can allow ingress and egress for a third-row seat in the vehicle.

Figure 11:
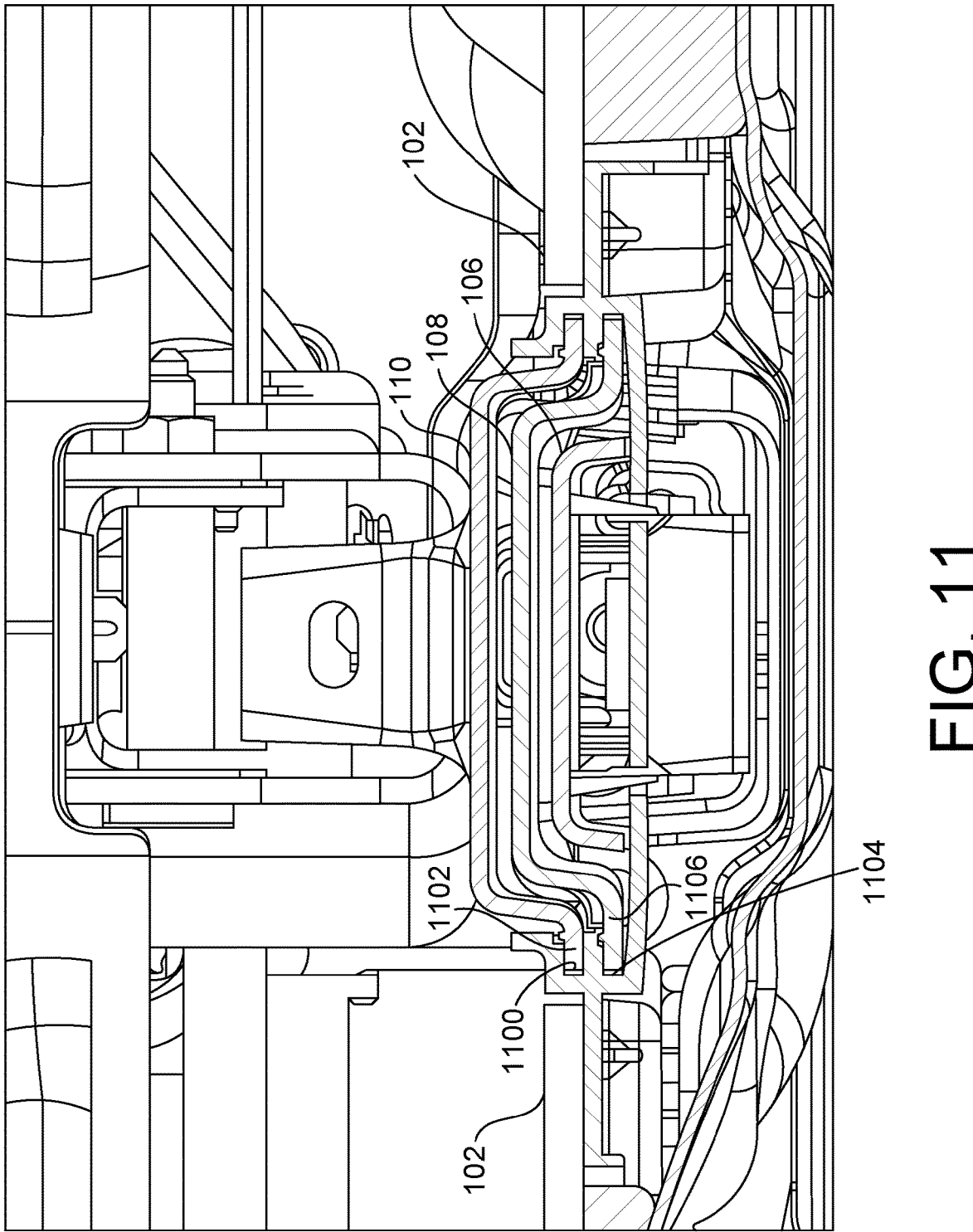
FIG. 11 shows an example of a cross section of the cover assembly of FIG. 10.

FIG. 11 shows an example of a cross section of the cover assembly of FIG. 10. The structural housing 102 and the telescoping covers 104 including the fixed cover 106, the moving cover 108, and the moving cover 110 are shown. The structural housing 102 defines side tracks 1100 for the moving cover 110. The side tracks 1100 are parallel with each other and extend along opposite sides of the opening of the structural housing 102 (e.g., as described below). The moving cover 110 has sliders 1102. At least one of the sliders 1102 is positioned on each of opposing sides of the moving cover 110. The sliders 1102 are positioned in the side tracks 1100.

The structural housing 102 defines side tracks 1104 for the moving cover 108. The side tracks 1104 are parallel with, and positioned below, the side tracks 1100. The side tracks 1104 are parallel with each other and extend along opposite sides of the opening of the structural housing 102 (e.g., as described below). The moving cover 108 has sliders 1106. At least one of the sliders 1106 is positioned on each of opposing sides of the moving cover 108. The sliders 1106 are positioned in the side tracks 1104.

The telescoping covers 104 can be shaped to facilitate good covering of the seat rail and also to be strong and stiff against loads. The fixed cover 106 can have a C-shaped profile (e.g., as shown) when viewed along the seat rail. The moving cover 108 can have a C-shaped profile (e.g., as shown) when viewed along the seat rail. The moving cover 110 can have a C-shaped profile (e.g., as shown) when viewed along the seat rail. For example, the fixed cover 106 and the moving covers 108-110 can be configured so that the C-shaped profile of the fixed cover 106 fits at least partially inside the C-shaped profile of the moving cover 108. As another example, the fixed cover 106 and the moving covers 108-110 can be configured so that the C-shaped profile of the moving cover 108 fits at least partially inside the C-shaped profile of the moving cover 110.

Figure 12:
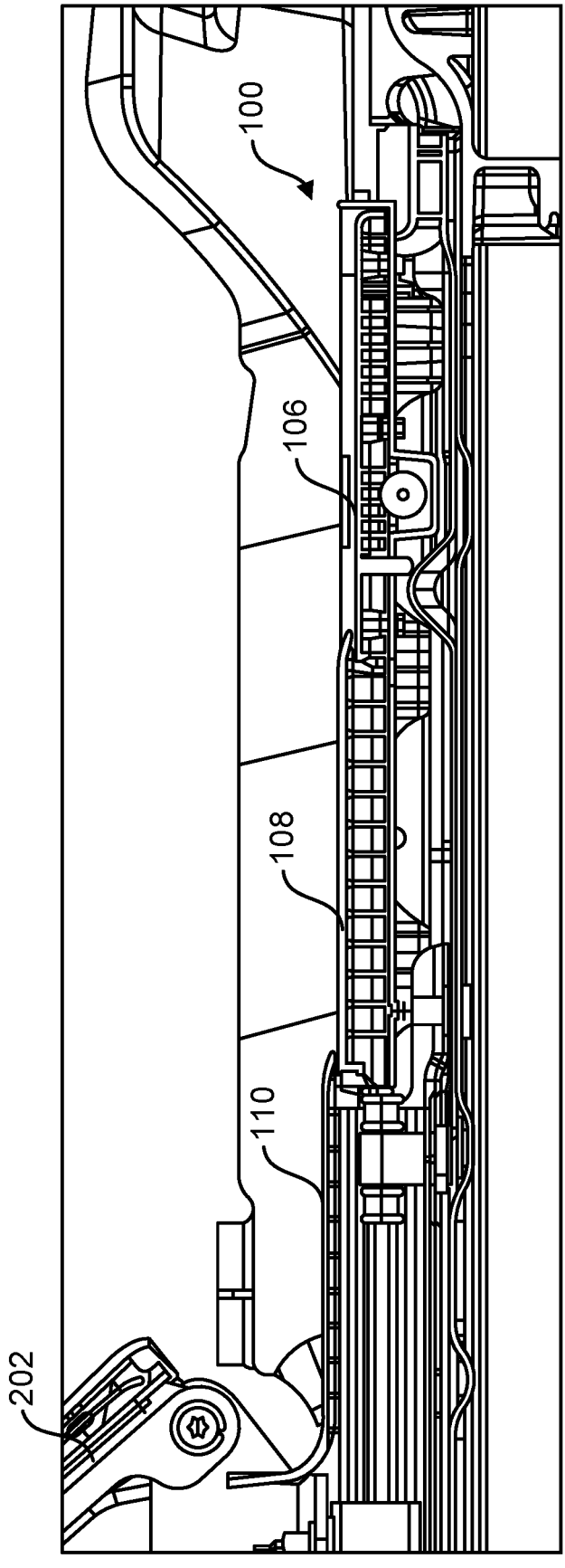
FIG. 12 shows an example of a cross section of the seat and the cover assembly of FIG. 8 in a fully rearward position.

FIG. 12 shows an example of a cross section of the seat 202 and the cover assembly 100 of FIG. 8 in a fully rearward position. The moving cover 110 is positioned substantially rearward of the moving cover 108. The moving cover 108 is positioned substantially rearward of the fixed cover 106.

Figure 13:
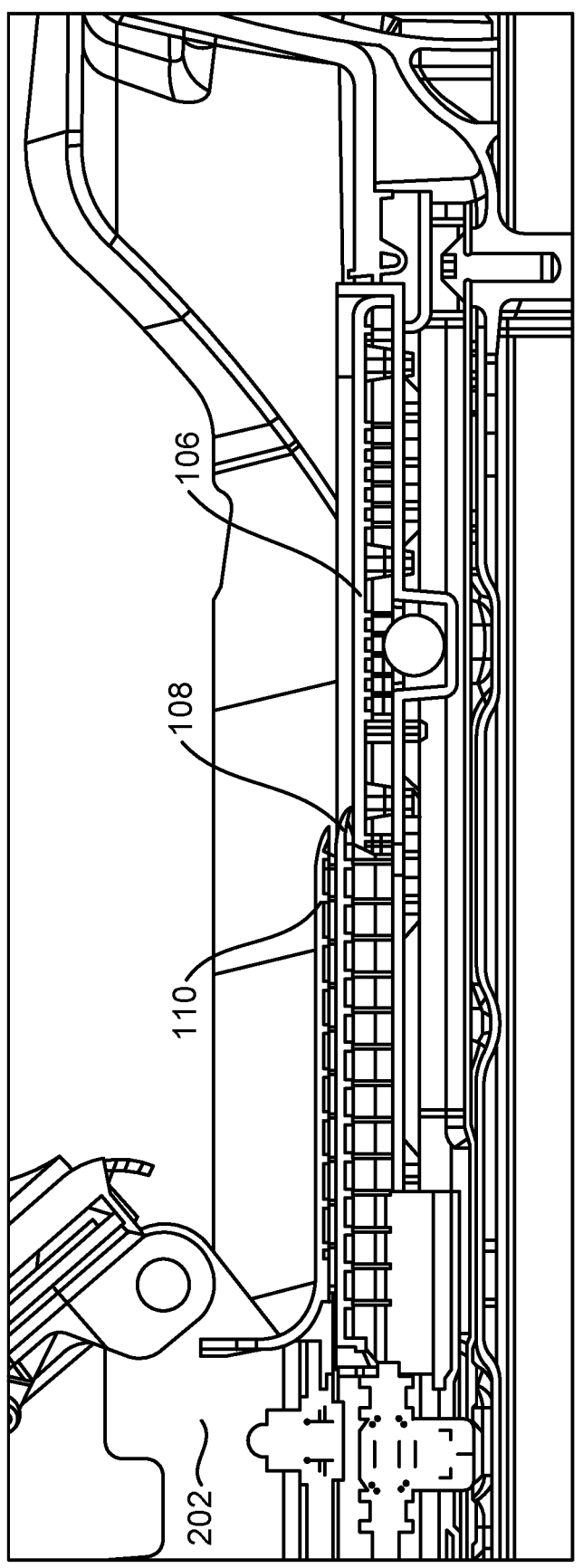
FIG. 13 shows an example of a cross section of the seat and the cover assembly of FIG. 9 in an intermediate position.

FIG. 13 shows an example of a cross section of the seat 202 and the cover assembly 100 of FIG. 9 in an intermediate position. The moving cover 110 has been moved forward to be substantially overlapping with the moving cover 108. The moving cover 108 has not moved relative to the fixed cover 106 compared with the position in FIG. 12.

Figure 14:
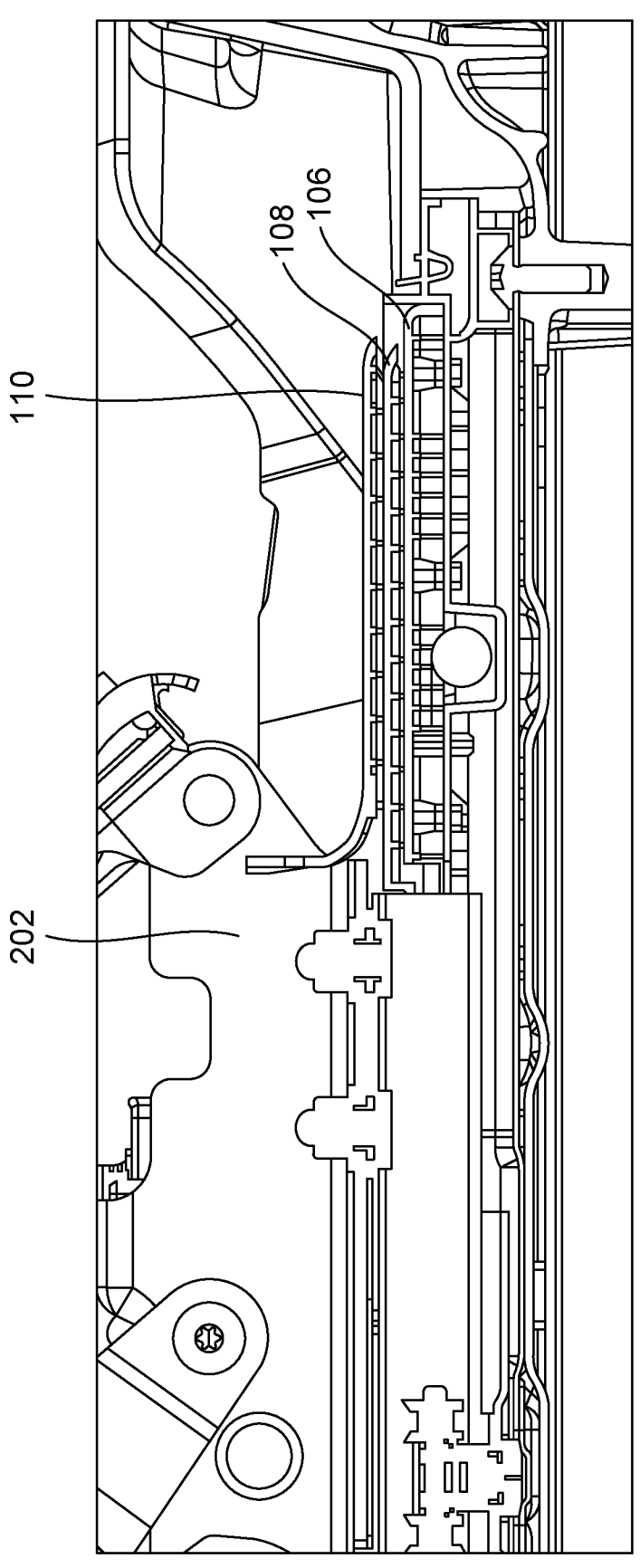
FIG. 14 shows an example of a cross section of the seat and the cover assembly of FIG. 8 in a fully forward position.

FIG. 14 shows an example of a cross section of the seat and the cover assembly of FIG. 8 in a fully forward position. The moving cover 110 and the moving cover 108 have been moved forward to be substantially overlapping with the fixed cover 106.

Figures 15, 16, 17:
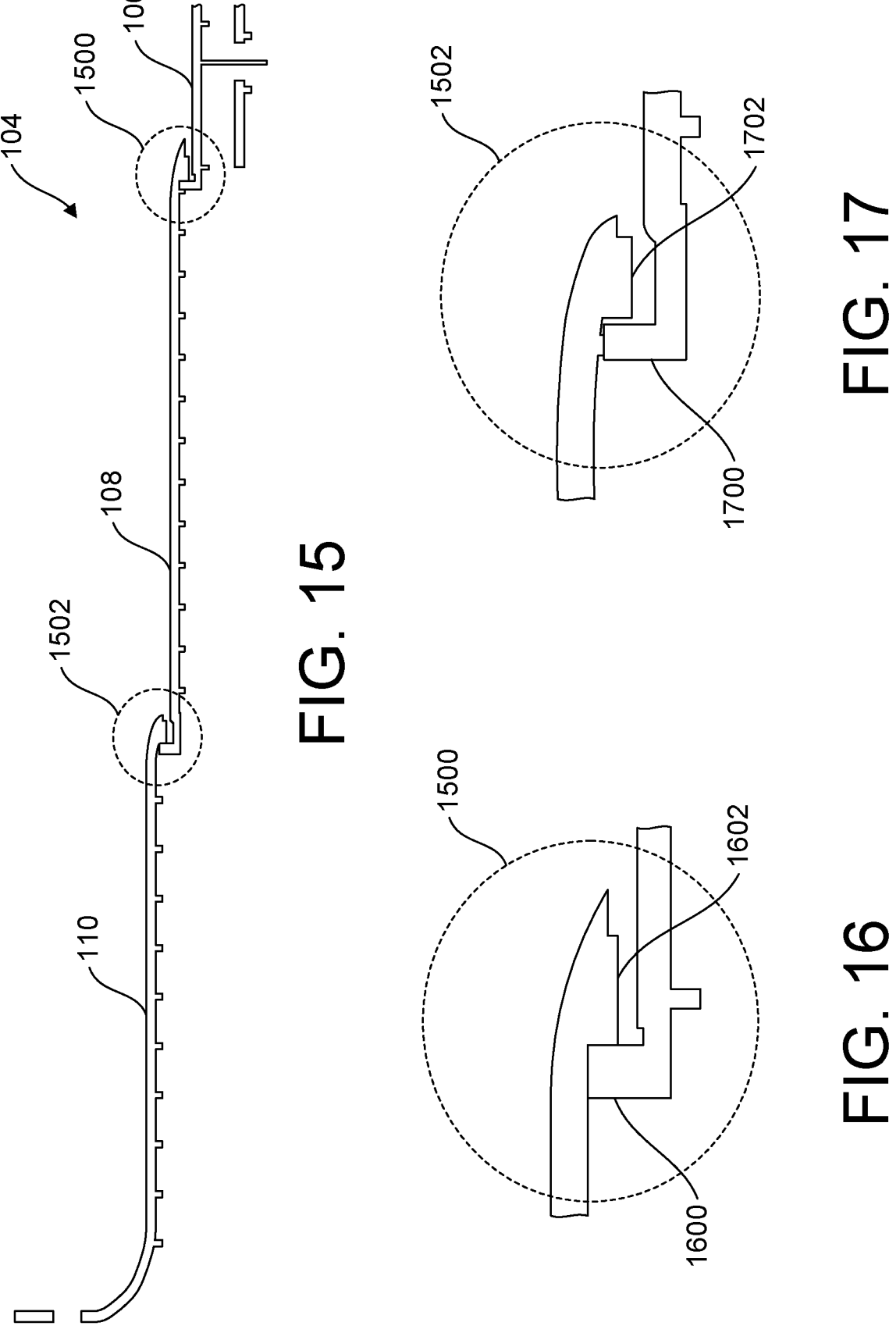
FIG. 15 shows an example of a cross section of the telescoping covers of the cover assembly of FIG. 1.
FIG. 16 shows an example of the detent of the fixed cover and one of the moving covers of FIG. 15.
FIG. 17 shows an example of the detent of the moving covers of FIG. 15.

FIG. 15 shows an example of a cross section of the telescoping covers 104 of the cover assembly 100 of FIG. 1. The fixed cover 106 is here partially visible. The cover assembly 100 can include a detent 1500 that limits movement of the moving cover 108 relative to the fixed cover 106. The cover assembly 100 can include a detent 1502 that limits movement of the moving cover 110 relative to the moving cover 108.

FIG. 16 shows an example of the detent 1500 of the fixed cover 106 and the moving cover 108 of FIG. 15. The detent 1500 can include a lip 1600 on the fixed cover 106 that extends toward the moving cover 108. The detent 1500 can include a lip 1602 on the moving cover 108 that extends toward the fixed cover 106. The lips 1600-1602 limit movement of the moving cover 108 relative to the fixed cover 106. For example, movement of the moving cover 108 toward the left in the illustration can be halted by the lips 1600-1602.

FIG. 17 shows an example of the detent 1502 of the moving covers 108-110 of FIG. 15. The detent 1502 can include a lip 1700 on the moving cover 108 that extends toward the moving cover 110. The detent 1502 can include a lip 1702 on the moving cover 110 that extends toward the moving cover 108. The lips 1700-1702 limit movement of the moving covers 108-110 relative to each other. For example, movement of the moving cover 110 toward the left in the illustration can cause the moving cover 108 to move toward the left.

Figure 18:
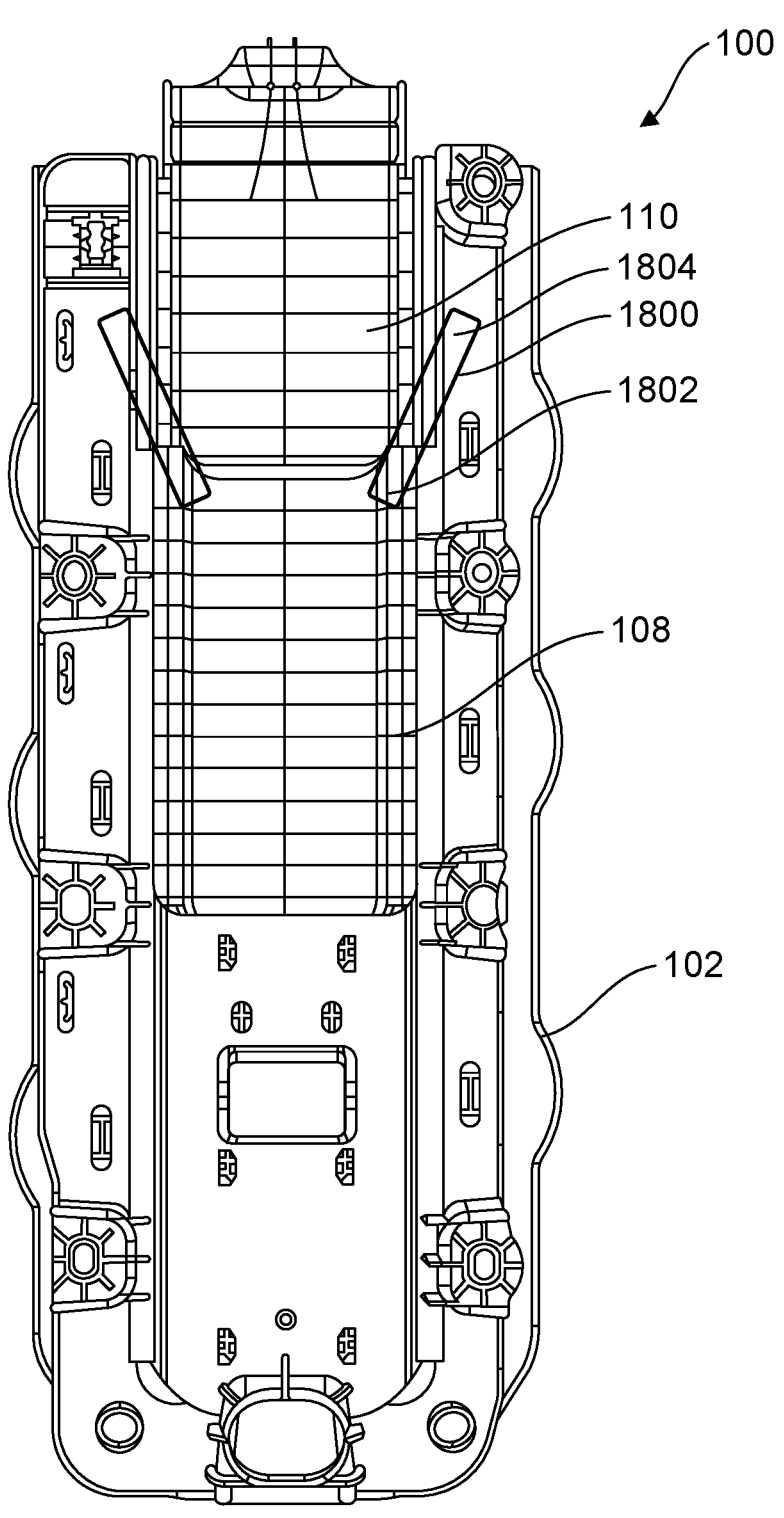
FIG. 18 shows an example of a bottom view of the cover assembly of FIG. 1 in a fully rearward position.

FIG. 18 shows an example of a bottom view of the cover assembly 100 of FIG. 1 in a fully rearward position. The structural housing 102 and the moving covers 108-110 are visible in this view. The fixed cover 106 is at an opposite side of the structural housing 102.

The cover assembly 100 includes a biasing member 1800 coupled to the moving cover 108 and to the structural housing 102. The biasing member 1800 is here schematically illustrated. For example, the biasing member 1800 extends from an anchor point 1802 on the moving cover 108 to an anchor point 1804 on the structural housing 102. Another location can be used for either or both of the anchor points 1802-1804. The biasing member 1800 biases the moving cover 108 in a direction away from the fixed cover 106. For example, the biasing member 1800 can apply tension to the moving cover 108 also in the use position shown, in which the seat is at its most rearward position. Any kind of biasing member can be used. In some implementations, the biasing member 1800 is an elastic band. The cover assembly 100 can include multiple instances of the biasing member 1800 coupled to the moving cover 108 and to the structural housing 102 (e.g., on opposite sides of the opening in the structural housing 102).

Figure 19:
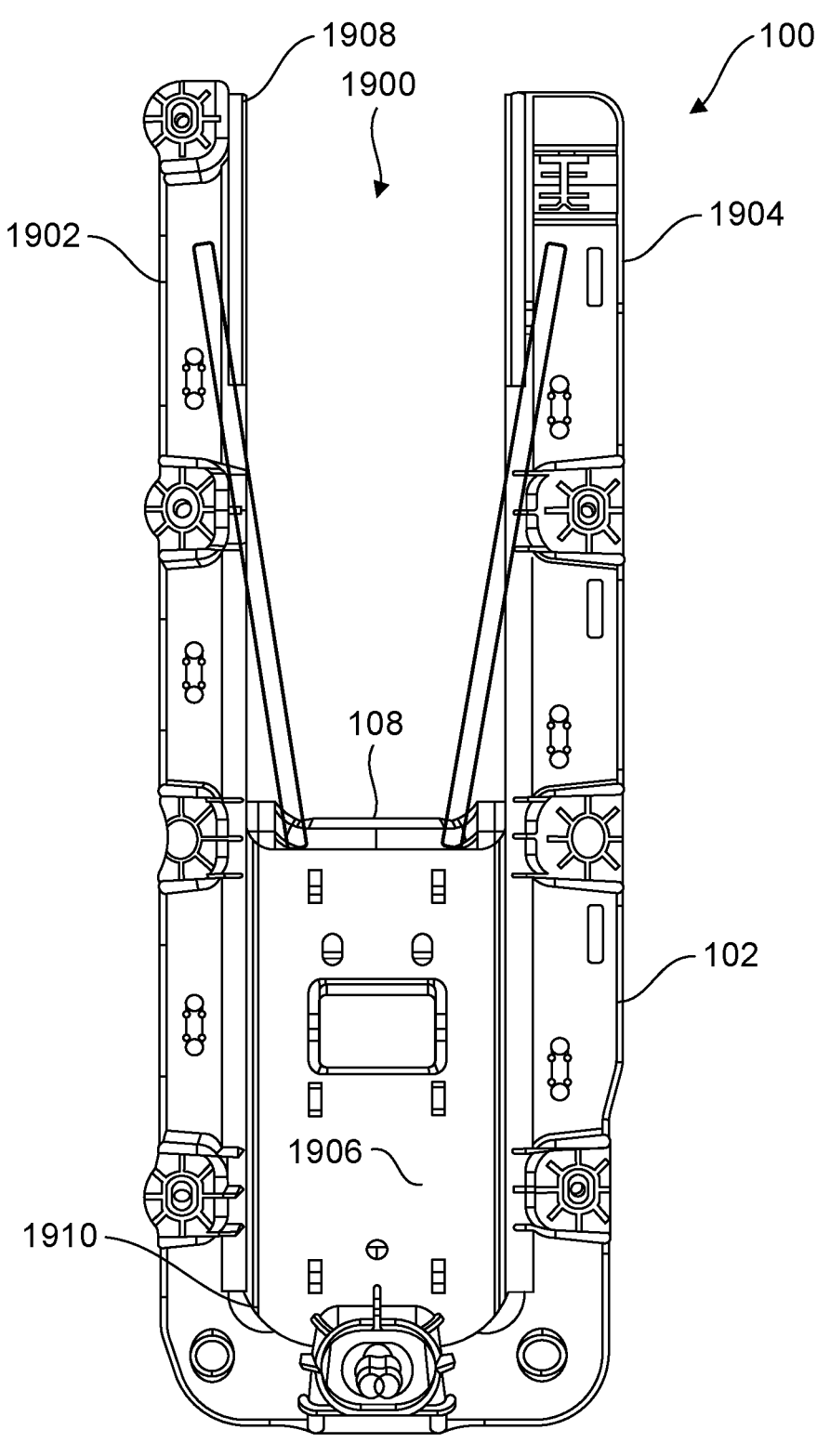
FIG. 19 shows an example of a bottom view of the cover assembly of FIG. 1 in a fully forward position.

FIG. 19 shows an example of a bottom view of the cover assembly 100 of FIG. 1 in a fully forward position. The structural housing 102 and the moving cover 108 are visible in this view. The moving cover 110 and the fixed cover 106 are at an opposite side of the structural housing 102. That is, the moving covers 108-110 here substantially overlap the fixed cover 106 at that opposite side of the structural housing 102. The biasing member 1800 is here further extended than in the example shown in FIG. 18.

The structural housing 102 has an opening 1900 for the moving seat rail 206 (FIG. 2). The structural housing 102 defines the opening 1900 by a track member 1902 that is parallel to a track member 1904, and by a base 1906. For example, the track members 1902-1904 can be the structure where the side tracks 1100 and 1104 (FIG. 11) are formed. The base 1906 is the structure that obscures the moving covers 108-110 and the fixed cover 106 in this view. The opening 1900 can be oriented toward a rear of the structural housing 102 when the cover assembly 100 is installed in a vehicle. That is, the fixed cover 106 can be positioned in front of the opening 1900. Each of the side tracks 1100 and 1104 (FIG. 11) can extend along opposite sides of the opening 1900 (e.g., along the track members 1902-1904) from a beginning 1908 of the opening 1900 and to a point 1910 past an end of the opening 1900.

The above examples illustrate that a cover assembly (e.g., the cover assembly 100 in FIG. 1) for a seat rail (e.g., the seat rail 204 of FIG. 2) mounted to a floor (e.g., the vehicle floor 500 of FIG. 5) of a vehicle (e.g., the vehicle 300 of FIG. 3) can include: a structural housing (e.g., the structural housing 102) configured to be mounted to the floor of the vehicle, the structural housing defining tracks (e.g., the side tracks 1100 and 1104 of FIG. 11), the tracks positioned on opposite sides (e.g., along the track members 1902-1904 of FIG. 19) of an opening (e.g., the opening 1900) for a moving seat rail (e.g., the moving seat rail 206 of FIG. 2) to ride on the seat rail; telescoping covers (e.g., the telescoping covers 104 in FIG. 1) comprising a fixed cover (e.g., the fixed cover 106 of FIG. 1) attached to the structural housing, a first moving cover (e.g., the moving cover 108) configured to slide on the tracks relative to the fixed cover, and a second moving cover (e.g., the moving cover 110) configured to be mounted to the moving seat rail and slide on the tracks relative to the first moving cover and the fixed cover; and a biasing member (e.g., the biasing member 1800 of FIG. 18) coupled to the first moving cover and to the structural housing.

The above examples also illustrate that a vehicle (e.g., the vehicle 300 of FIG. 3) can include: a vehicle body including a passenger compartment (e.g., the passenger compartment 302 of FIG. 3); a seat (e.g., the seat 202 of FIG. 2) having a first moving seat rail (e.g., the moving seat rail 206 of FIG. 2) to ride on a first seat rail (e.g., the seat rail 204) mounted to a floor (e.g., the vehicle floor 500 of FIG. 5) of the passenger compartment; and a first cover assembly (e.g., the cover assembly 100 in FIG. 1) for the first seat rail, the first cover assembly comprising: a first structural housing (e.g., the structural housing 102) configured to be mounted to the floor of the vehicle, the first structural housing defining tracks (e.g., the side tracks 1100 and 1104 of FIG. 11), the tracks positioned on opposite sides (e.g., along the track members 1902-1904 of FIG. 19) of an opening (e.g., the opening 1900) for the moving seat rail to ride on the seat rail; first telescoping covers (e.g., the telescoping covers 104 in FIG. 1) comprising a fixed cover (e.g., the fixed cover 106 of FIG. 1) attached to the structural housing, a first moving cover (e.g., the moving cover 108) configured to slide on the tracks relative to the fixed cover, and a second moving cover (e.g., the moving cover 110) configured to slide on the tracks relative to the first moving cover and the fixed cover; and a first biasing member (e.g., the biasing member 1800 of FIG. 18) coupled to the first moving cover and to the structural housing.

Figure 20:
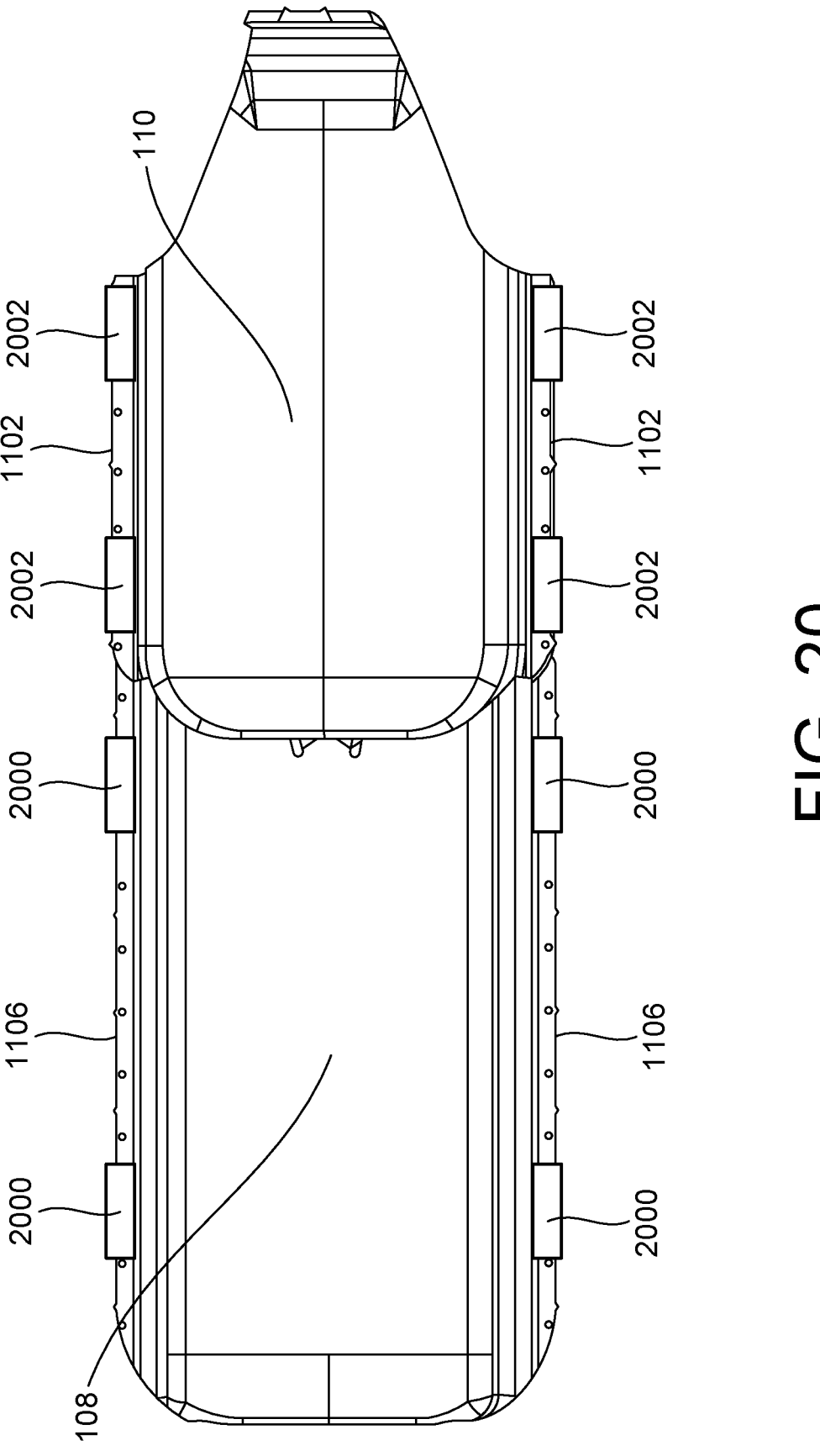
FIG. 20 shows an example of the moving covers of the cover assembly of FIG. 1 having friction-reducing sliders at the sliders.

FIG. 20 shows an example of the moving covers 108-110 of the cover assembly 100 of FIG. 1 having friction-reducing sliders at the sliders. The moving cover 108 has friction-reducing sliders 2000 at the sliders 1102. The moving cover 110 has friction-reducing sliders 2002 at the sliders 1106. The friction-reducing sliders 2000-2002 can be made of any material that lowers the coefficient of friction for the moving covers 108-110. In some implementations, the friction-reducing sliders 2000-2002 include a low-friction plastic material. For example, polyoxymethylene can be used.

Figure 21:
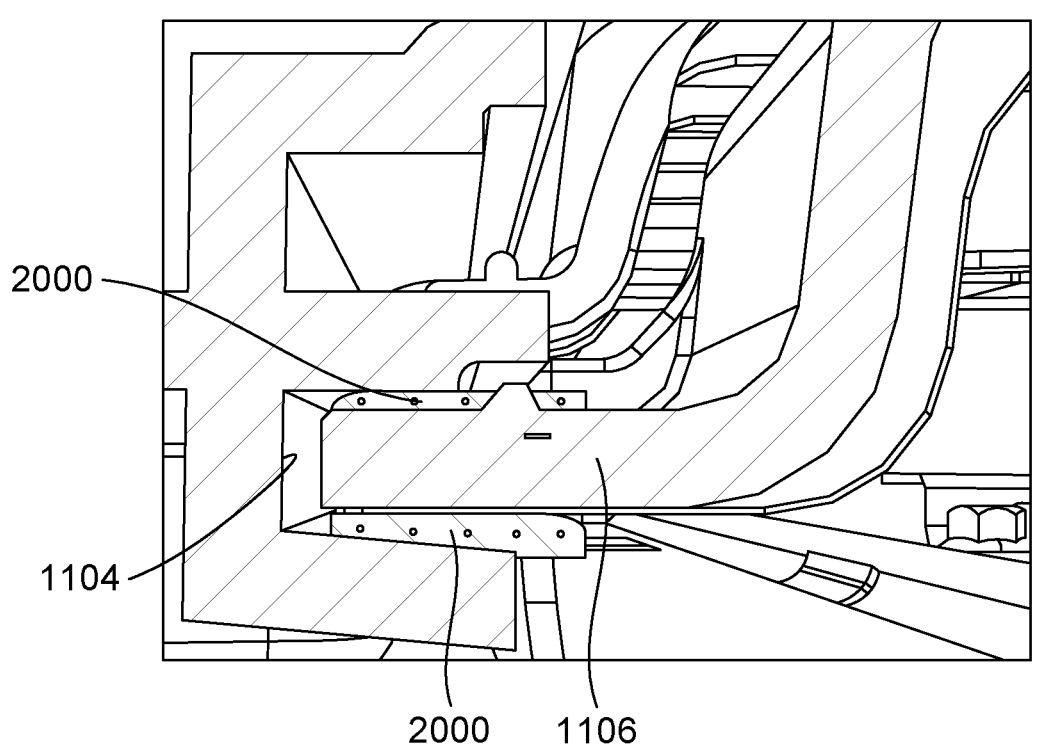
FIG. 21 shows an example of the friction-reducing slider mounted between the slider and the side track.

FIG. 21 shows an example of the friction-reducing slider 2000 mounted between the slider 1106 and the side track 1104. For example, the friction-reducing slider 2000 can be applied to the slider 1106. As another example, the friction-reducing slider 2000 can be applied to the side track 1104.

Figure 22:
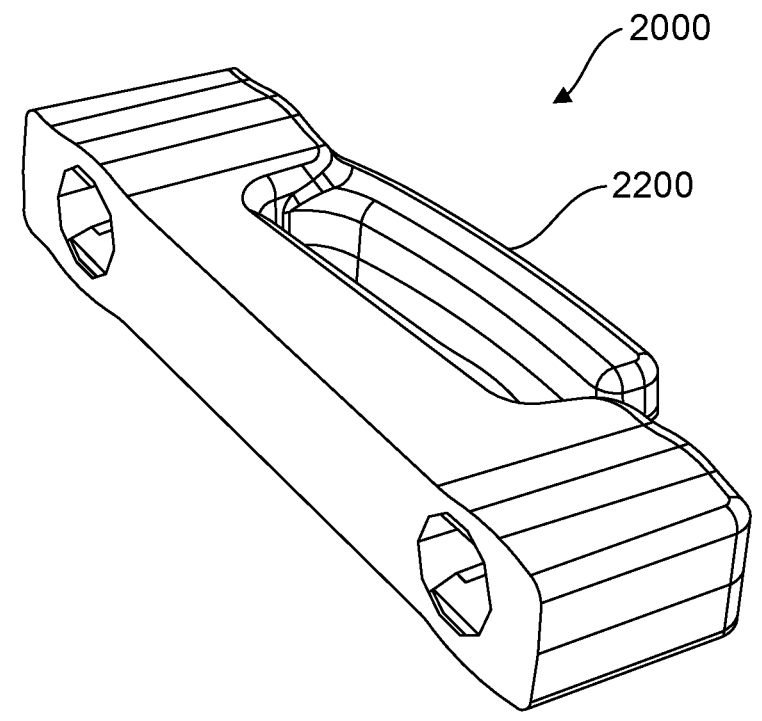
FIG. 22 shows an example of the friction-reducing slider of FIG. 20.

FIG. 22 shows an example of the friction-reducing slider 2000 of FIG. 20. The friction-reducing slider 2000 has a feature 2200 on its side. The feature 2200 can be a barb or protrusion. The feature 2200 can rest against a side wall of the side track 1104. The feature 2200 can be bendable and help center the slider 1106 in a transverse direction in the vehicle.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A cover assembly for a seat rail mounted to a floor of a vehicle, the cover assembly comprising:
a structural housing configured to be mounted to the floor of the vehicle, the structural housing defining tracks, the tracks positioned on opposite sides of an opening for a moving seat rail to ride on the seat rail;
telescoping covers comprising a fixed cover attached to the structural housing, a first moving cover configured to slide on the tracks relative to the fixed cover, and a second moving cover configured to be mounted to the moving seat rail and slide on the tracks relative to the first moving cover and the fixed cover; and
a biasing member directly coupled to the first moving cover and to the structural housing.

2. The cover assembly of claim 1, wherein the cover assembly is configured for installation in front of a seat that has the moving seat rail.

3. The cover assembly of claim 1, wherein the biasing member comprises an elastic band.

4. The cover assembly of claim 1, wherein the first moving cover has a first C-shaped profile when viewed along the seat rail.

5. The cover assembly of claim 4, wherein the second moving cover has a second C-shaped profile when viewed along the seat rail.

6. The cover assembly of claim 5, wherein the fixed cover has a third C-shaped profile when viewed along the seat rail.

7. The cover assembly of claim 6, wherein the first, second and third C-shaped profiles are configured so that i) the third C-shaped profile fits at least partially inside the first C-shaped profile, and ii) the first C-shaped profile fits at least partially inside the second C-shaped profile.

8. The cover assembly of claim 1, wherein the tracks are formed by recesses in the structural housing.

9. A cover assembly for a seat rail mounted to a floor of a vehicle, the cover assembly comprising:

a structural housing configured to be mounted to the floor of the vehicle, the structural housing defining tracks, the tracks positioned on opposite sides of an opening for a moving seat rail to ride on the seat rail;
telescoping covers comprising a fixed cover attached to the structural housing, a first moving cover configured to slide on the tracks relative to the fixed cover, and a second moving cover configured to be mounted to the moving seat rail and slide on the tracks relative to the first moving cover and the fixed cover; and
a biasing member coupled to the first moving cover and to the structural housing;
wherein the opening is toward a rear of the structural housing when the cover assembly is installed in the vehicle.

10. The cover assembly of claim 9, wherein the cover assembly has at least a first use position corresponding to the moving seat rail being in a position fully rearward in the opening, and wherein in the first use position the first and second moving covers are positioned to cover the opening.

11. The cover assembly of claim 10, wherein the cover assembly has at least a second use position corresponding to the moving seat rail being in a position fully forward in the opening, and wherein in the second use position the fixed cover, the first moving cover, and the second moving cover are all substantially overlapping in front of the opening.

12. A cover assembly for a seat rail mounted to a floor of a vehicle, the cover assembly comprising:
a structural housing configured to be mounted to the floor of the vehicle, the structural housing defining tracks, the tracks positioned on opposite sides of an opening for a moving seat rail to ride on the seat rail;
telescoping covers comprising a fixed cover attached to the structural housing, a first moving cover configured to slide on the tracks relative to the fixed cover, and a second moving cover configured to be mounted to the moving seat rail and slide on the tracks relative to the first moving cover and the fixed cover;
a biasing member coupled to the first moving cover and to the structural housing; and
a detent that limits movement of the first moving cover relative to the fixed cover.

13. The cover assembly of claim 12, wherein the detent comprises a first lip on the fixed cover that extends toward the first moving cover, and a second lip on the first moving cover that extends toward the fixed cover.

14. A cover assembly for a seat rail mounted to a floor of a vehicle, the cover assembly comprising:
a structural housing configured to be mounted to the floor of the vehicle, the structural housing defining tracks, the tracks positioned on opposite sides of an opening for a moving seat rail to ride on the seat rail;
telescoping covers comprising a fixed cover attached to the structural housing, a first moving cover configured to slide on the tracks relative to the fixed cover, and a second moving cover configured to be mounted to the moving seat rail and slide on the tracks relative to the first moving cover and the fixed cover;
a biasing member coupled to the first moving cover and to the structural housing; and
a detent that limits movement of the first and second moving covers relative to each other.

15. The cover assembly of claim 14, wherein the detent comprises a first lip on the first moving cover that extends toward the second moving cover, and a second lip on the second moving cover that extends toward the first moving cover.

16. A cover assembly for a seat rail mounted to a floor of a vehicle, the cover assembly comprising:

a structural housing configured to be mounted to the floor of the vehicle, the structural housing defining tracks, the tracks positioned on opposite sides of an opening for a moving seat rail to ride on the seat rail;

telescoping covers comprising a fixed cover attached to the structural housing, a first moving cover configured to slide on the tracks relative to the fixed cover, and a second moving cover configured to be mounted to the moving seat rail and slide on the tracks relative to the first moving cover and the fixed cover; and a biasing member coupled to the first moving cover and to the structural housing;

wherein the tracks comprise:

first side tracks that are parallel with each other and extend along opposite sides of the opening from a beginning of the opening and to a point past an end of the opening, wherein the first moving cover defines first sliders, at least one of the first sliders positioned on each of opposite sides of the first moving cover, the first sliders positioned in the first side tracks; and second side tracks that are parallel with each other and extend along the opposite sides of the opening from the beginning of the opening and to the point past an end of the opening, the second side tracks being parallel with, and positioned below, the first side tracks, wherein the second moving cover defines second sliders, at least one of the second sliders positioned on each of opposite sides of the second moving cover, the second sliders positioned in the second side tracks.

17. The cover assembly of claim 16, further comprising friction-reducing sliders, the friction-reducing sliders mounted between each of the first sliders and the first side tracks, and between each of the second sliders and the second side tracks.

18. A cover assembly for a seat rail mounted to a floor of a vehicle, the cover assembly comprising:

a structural housing configured to be mounted to the floor of the vehicle, the structural housing defining:

an opening for a moving seat rail to ride on the seat rail;

first side tracks that are parallel with each other and extend along opposite sides of the opening from a beginning of the opening and to a point past an end of the opening; and second side tracks that are parallel with each other and extend along the opposite sides of the opening from the beginning of the opening and to the point past an end of the opening, the second side tracks being parallel with, and positioned below, the first side tracks;

a fixed cover that is fixed to the structural housing;

a first moving cover having first sliders, at least one of the first sliders positioned on each of opposing sides of the first moving cover, the first sliders positioned in the first side tracks; and a second moving cover having second sliders, at least one of the second sliders positioned on each of opposing sides of the second moving cover, the second sliders positioned in the second side tracks, the second moving cover to be mounted to the moving seat rail.

19. A vehicle comprising:

a vehicle body including a passenger compartment;

a seat having a first moving seat rail to ride on a first seat rail mounted to a floor of the passenger compartment; and a first cover assembly for the first seat rail, the first cover assembly comprising:

a first structural housing configured to be mounted to the floor of the vehicle, the first structural housing defining tracks, the tracks positioned on opposite sides of an opening for the first moving seat rail to ride on the first seat rail;

first telescoping covers comprising a fixed cover attached to the structural housing, a first moving cover configured to slide on the tracks relative to the fixed cover, and a second moving cover configured to slide on the tracks relative to the first moving cover and the fixed cover; and a first biasing member directly coupled to the first moving cover and to the structural housing.

20. The vehicle of claim 19, wherein the seat further has a second moving seat rail to ride on a second seat rail mounted to the floor of the passenger compartment, the vehicle further comprising a second cover assembly including a second structural housing, second telescoping covers, and a second biasing member.

* * * * *